United States Patent [19]

Gaines

[11] Patent Number: 4,497,767
[45] Date of Patent: Feb. 5, 1985

[54] COMPRESSION HUB WITH EDDY CURRENT PREVENT MEANS

[75] Inventor: Albert L. Gaines, West Simsbury, Conn.

[73] Assignee: Combustion Engineering, Inc., Windsor, Conn.

[21] Appl. No.: 120,192

[22] Filed: Feb. 11, 1980

[51] Int. Cl.³ .............................................. G21B 1/00
[52] U.S. Cl. .................................................... 376/142
[58] Field of Search .................... 176/2, 3, 9; 376/142

[56] References Cited

U.S. PATENT DOCUMENTS 4,174,254 11/1979 Gaines ..................................... 176/2

OTHER PUBLICATIONS

ORO-5152-1, (12/76), "Design Study of Toroidal Magnets for Tokamak Experimental Power Reactors", pp. AII-50, 51, 63, 64.
Proc. 7th Symp. on Eng. Pbs. of Fus. Res., vol. 1, 10/77, pp. 723–727, Brown et al.

Primary Examiner—Sal Cangialosi
Attorney, Agent, or Firm—Arthur E. Fournier, Jr.

[57] ABSTRACT

A compression hub (10) for use in a fusion reactor system comprising a multiplicity of compression plates (24, 24') that are polygonal in configuration, and which are arranged in vertically stacked, substantially abutting relation to each other. The compression plates (24, 24') are suitably interconnected, such as by welding, around the periphery thereof so as to provide a compression hub (10) that is in the form of a unitary structure. Each of the compression plates (24, 24') is provided with fluid flow means (30, 32, 30', 32'). The fluid flow means (30, 32, 30', 32') of the compression plates (24, 24') cooperate with one another to establish a fluid flow path for coolant through the compression hub (10). Each of the compression plates (24, 24') is further provided with eddy current prevent means operable to impede the circulation through the plates (24, 24') of eddy currents induced by changes in the magnetic flux field. The eddy current prevent means comprises one or more interruptions formed in each of the compression plates (24, 24') so as to extend completely therethrough.

3 Claims, 5 Drawing Figures

COMPRESSION HUB WITH EDDY CURRENT PREVENT MEANS

BACKGROUND OF THE INVENTION

This invention relates to compression hubs of the type that are employable in cooperative association with a plurality of magnets in a fusion reactor system, and, more particularly, to such a compression hub which is equipped with eddy current prevent means operable to impede the circulation therethrough of eddy currents induced by changes in the magnetic flux field.

One form of fusion reactor that has been proposed for use by the prior art is the so-called Tokamak-type reactor. In accordance with the mode of operation of this type of reactor, thermal power is generated as a consequence of the ignition of plasma. There exists, however, in this type of reactor not only a need to ignite the plasma, but also a need for effecting control over the plasma.

One technique which has been proposed for use for purposes of effecting control over the plasma is that of magnetic confinement. More specifically, it has been proposed to employ for this purpose a plurality of superconducting magnets operating at cryogenic temperatures. Through the use of such magnets, it is possible to attain intense magnetic fields of a strength sufficient to effect the desired confinement of the plasma.

To produce the desired result, the superconducting magnets are preferably arranged relative to each other so that they extend outwardly from a common point, in a manner similar to that of the spokes of a wheel. These magnets generate intense forces, tending to draw them together to the common point. Thus, there is a need created to provide means operative to resist the forces tending to draw the magnets together. One means contemplated for use for this purpose is a compression hub, also commonly referred to as a bucking post.

One form of a compression hub, which is suitable for use for the afore-described purpose, comprises the subject matter of my earlier U.S. Pat. No. 4,174,254, which issued on Nov. 13, 1979, and which is assigned to the same assignee as the present invention. As discussed therein, a compression hub, in order to be suitable for use for the purpose described above, must be susceptible to being cooled to the same relative temperature as the superconducting magnets, i.e., to cryogenic temperatures. In addition, this cooling of the compression hub must be capable of being accomplished while at the same time ensuring that the structural adequacy of the compression hub is maintained.

Regarding the matter of cooling, as set forth in my aforementioned earlier issued U.S. patent, the normal operative temperature range for the superconducting magnets is 4.2° to 4.9° kelvin. To achieve this range of temperatures, the magnets are preferably cooled by liquid helium, which boils at 4.2° kelvin at atmospheric pressure. Because of the criticality of the operating temperature, it is necessary that the compression hub, which is cooperatively associated with the superconducting magnets, be cooled also to the same temperature as the magnets. Otherwise, heat transfer in the form of a heat loss could take place between the compression hub and the magnets cooperatively associated therewith whereby the operating effectiveness of the magnets would be seriously impaired.

Not only is it necessary that the operating temperature of the compression hub be maintained at the same operating temperature as the superconducting magnets, but also it is important that the compression hub be capable of being cooled to the desired operating temperature of 4.2° kelvin in a relatively short period of time. One method of effecting the desired cooling of the compression hub is to depend on the cooling effect of the magnets to remove heat from the compression hub. However, this could take an inordinate amount of time to achieve, which would be totally unacceptable from the standpoint of how long it takes to render the system operative, particularly in a start-up situation. The reason for this, as discussed in my aforementioned earlier issued U.S. patent, is that at these very low temperatures the thermal gradient between the compression hub and the magnets cooperatively associated therewith is so small that virtually no cooling of the compression hub is effected. It, therefore, becomes necessary to supply coolant to the compression hub itself. More specifically, fluid flow paths must be established for coolant in the compresion hub. However, as noted previously hereinabove, the coolant flow paths in the compression hub must be provided in such a manner as to not adversely affect the structural adequacy of the compression hub, i.e., the ability of the compression hub to resist the forces tending to draw the magnets together to a common point.

One form of compression hub, which fulfills the above-stated requirements for a compression hub employable in a Tokamak-type fusion reactor system, has been described and illustrated in my aforementioned earlier issued U.S. patent. In addition, an alternative form of construction for a compression hub, which also satisfies the above-stated requirements, comprises the subject matter of Penfield patent application, Ser. No. 000,047, filed on Jan. 2, 1979, which issued on Sept. 1, 1981 as U.S. Pat. No. 4,287,022, and assigned to the same assignee as the present invention. To summarize, these two alternative forms of construction for a compression hub are deemed to be equally suitable for use in a Tokamak-type fusion reactor system insofar as concerns fulfilling those requirements for such a structure, which have been stated hereinbefore.

However, in addition to those requirements that have been set forth above, it is also desirable that a compression hub embody means operable for impeding the circulation therethrough of eddy currents. The latter, as is known to those skilled in the art, comprise those currents which are induced in the body of a conducting mass as a consequence of a variation in magnetic flux. The presence of circulating eddy currents would disadvantageously characterize the compression hub, insofar as concerns the ability of the latter to provide the type of performance being sought therefrom, when the latter is being employed in cooperative association with a plurality of superconducting magnets in a Tokamak-type fusion reactor system. Accordingly, it is contemplated in accord with the present invention to interrupt the surface of the elements that collectively comprise the compression hub so as to prohibit the circulation through the latter of the aforedescribed eddy currents. However, there is a need to accomplish the aforesaid interruption in the surfaces of the elements without adversely affecting either the strength of the compression hub, i.e., the capability of the latter to successfully resist the forces tending to draw the magnets thereagainst, or the ability of the compression hub to be cooled to a satisfactory level, i.e., the existence of a sufficient flow of coolant through the compression hub so as to enable the latter to be cooled to a temperature of 4.2° kelvin. In summary, there has been deemed to exist a need to provide a compression hub with suitable means to insure that the latter will not be disadvantageously characterized as a result of the inducement therein of eddy currents that would otherwise be free to circulate therethrough.

It is, therefore, an object of the present invention to provide a compression hub that is designed to be cooperatively associated with a plurality of superconducting magnets in a Tokamak-type fusion reactor system.

It is another object of the present invention to provide such a compression hub which embodies sufficient structural strength as to be capable of resisting the intense forces produced by the superconducting magnets that tend to draw the latter together towards a common point whereat the compression hub is located.

It is still another object of the present invention to provide such a compression hub which embodies a construction that permits the latter to be cooled to a temperature that is commensurate with the operating temperature of the superconducting magnets, while yet enabling the compression hub to retain the structural strength required thereof.

A further object of the present invention is to provide such a compression hub which embodies means operative to impede the circulation of eddy currents therethrough, while yet possessing the strength and cooling characteristics desired therefrom.

A still further object of the present invention is to provide a compression hub embodying such eddy current prevent means wherein the latter consists of an interruption provided in the surface of the elements that collectively comprise the compression hub.

Yet another object of the present invention is to provide such a compression hub embodying eddy current prevent means wherein the interruption provided in the surface of the elements takes the form of a radial cut in which an insulative material is inserted.

Yet still another object of the present invention is to provide a compression hub embodying eddy current means wherein the interruption provided in the surface of the elements is effected by fabricating the elements from multiple segments that in the assembled state are separated one from another by means of insulative material.

SUMMARY OF THE INVENTION

In accordance with the present invention, there is provided a new and improved form of compression hub that is designed to be cooperatively associated with a plurality of superconducting magnets in a Tokamak-type fusion reactor system. The subject compression hub is operative to resist the intense forces brought to bear thereagainst by the superconducting magnets, whilst yet possessing the capability of being cooled to a temperature commensurate with the operating temperature of the superconducting magnets. Further, the subject compression hub embodies means operative to impede the circulation of eddy currents therethrough. To this end, the compression hub comprises a multiplicity of compression plates that are polygonal in configuration, and which are arranged in vertically stacked, substantially abutting relation to each other. The aforementioned eddy current prevent means consists of an interruption that is provided in the surface of the compression plates. In accord with one aspect of the present invention, the interruption is in the form of a radial cut in which insulative material in inserted. In accord with another aspect of the invention, the interruption is effected by fabricating the compression plates from multiple segments which in the assembled state are separated one from another through the use of layers of insulative material.

DESCRIPTION OF A PREFERRED EMBODIMENT

Figure 1:
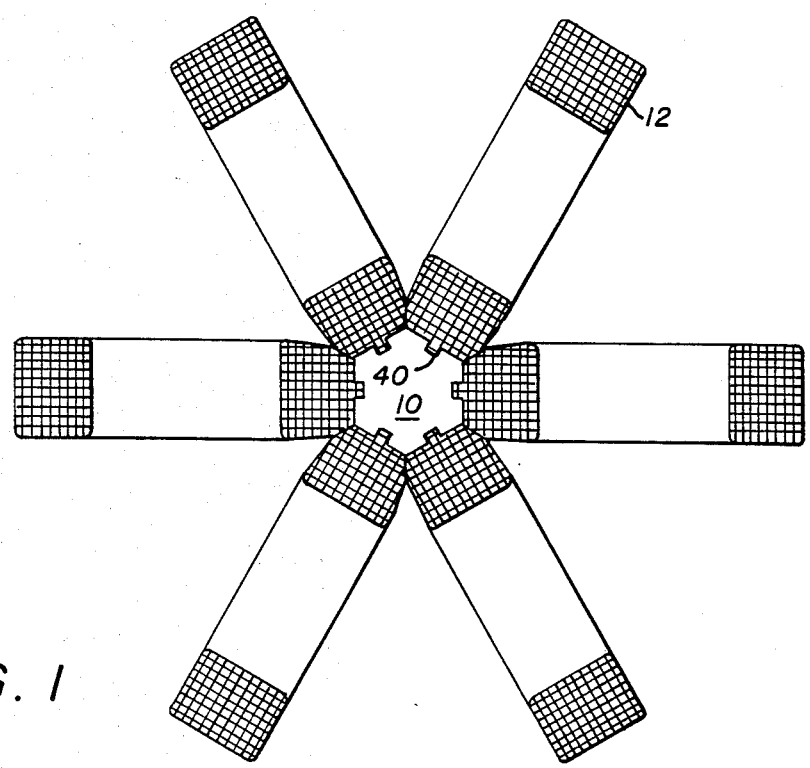
FIG. 1 is a plan view of a portion of a Tokamak-type fusion reactor system illustrating a compression hub with eddy current prevent means constructed in accord with the present invention, and depicted cooperatively associated with a plurality of superconducting magnets.

Referring now to the drawing, and more particularly to FIG. 1 thereof, there is illustrated therein a portion of a fusion reactor system of the Tokamak-type. More specifically, there is depicted in FIG. 1 of the drawing, a compression hub, generally designated by reference numeral 10, constructed in accordance with the present invention. Cooperatively associated with the compression hub, as shown in FIG. 1, are a plurality of superconducting magnets 12. Inasmuch as all of the superconducting magnets 12 are of identical construction, it has been deemed appropriate to designate each of the magnets by means of the same reference numeral, i.e., 12. In accordance with the illustrated embodiment of the invention, the superconducting magnets 12 comprise six in number.

Although the compression hub 10 is intended to be employed in a Tokamak-type fusion reactor system, it is not deemed necessary for purposes of obtaining an understanding of the present invention that a complete description of the nature of the construction and the mode of operation of such a fusion reactor system be set forth herein and/or illustrated in the drawing. Rather, it is deemed sufficient to merely note herein that in accordance with the mode of operation of such a fusion reactor system, thermal power is generated as a consequence of the ignition of plasma. Moreover, there exists a need to effect confinement of the plasma. The latter function, in turn, is accomplished magnetically through the use of a plurality of superconducting magnets, such as the superconducting magnet 12 shown in FIG. 1 of the drawing. Namely, the magnets 12 are capable of generating intense magnetic fields of sufficient strength to achieve the desired confinement of the plasma.

In order to be operative for its intended purpose, there are basically two major functional requirements that the compression hub 10 must be capable of fulfilling. First, the compression hub must be capable of successfully resisting the intense forces produced by the magnets 12 tending to draw the latter together towards a common point. Secondly, the compression hub 10 must be susceptible to being cooled to the same relative temperature as the superconducting magnets 12; namely, to a cryogenic temperature of approximately 4.2° kelvin. Moreover, the latter cooling of the compression hub 10 must be achieved without adversely affecting the structural strength thereof.

Figure 2:
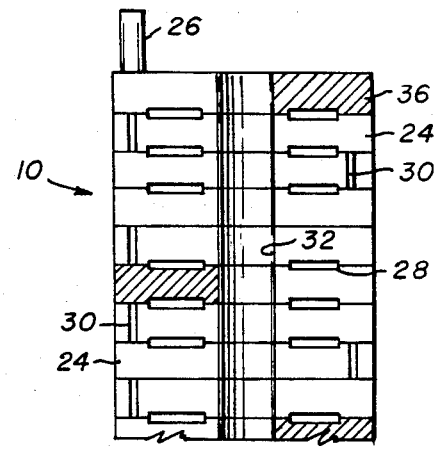
FIG. 2 is a cross-sectional view of a portion of a compression hub with eddy current prevent means constructed in accordance with the present invention.
Figure 3:
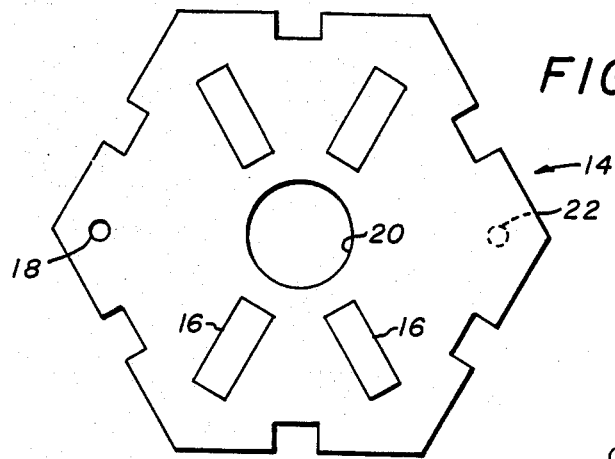
FIG. 3 is a plan view of a prior art form of compression plate designed for use in a prior art form of compression hub.
Figure 4:
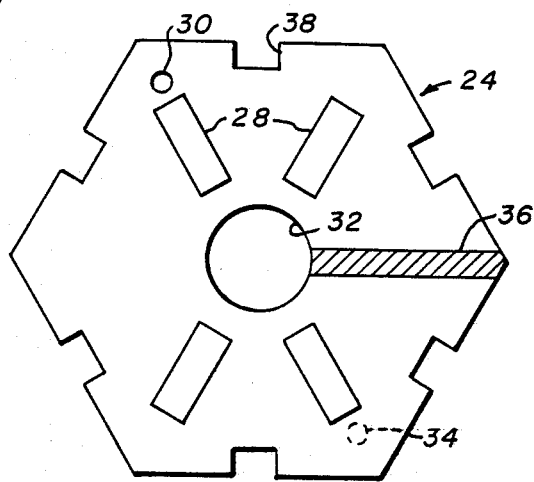
FIG. 4 is a plan view of one embodiment of a compression plate employable in a compression hub with eddy current prevent means constructed in accordance with the present invention.

Proceeding now with a description of the nature of the construction of the compression hub shown in FIG. 1, reference will be had for this purpose particularly to FIGS. 2, 3 and 4 of the drawing. Thus, with reference first to FIG. 3 of the drawing, there is depicted therein a prior art form of compression plate, the latter being designated therein generally through the use of the reference numeral 14. In accord with the teachings of the prior art, and as exemplified by the description thereof contained in previously referenced U.S. Pat. No. 4,174,254, the compression plate 14 is designed to be employed as one of a multiplicity of such plates which when suitably assembled one with another collectively function to produce a prior art form of compression hub. Inasmuch as the details of construction and the mode of operation thereof can be adequately found set forth in the aforementioned patent, it is not deemed necessary that they be reiterated herein. Rather, it is deemed sufficient to merely take note of the fact that the compression hub 14 is suitably constructed so as to embody the requisite means whereby the strength and cooling characteristics that a compression hub must possess in order to be operative for its intended purpose when employed in a Tokamak-type fusion reactor system are achievable therewith.

To this end, the compression plate 14 is formed of aluminum, stainless steel, or some other metal suitable for employment for purposes of resisting substantial forces at cryogenic temperatures. Further, the compression plate 14 embodies a polygonal shape, i.e., that of a hexagon. In addition, the upper and lower planar surfaces of the compression plate 14 both have formed therein a suitable number of recesses (not shown). The latter recesses (not shown) are suitably located in spaced relation one to another and are suitably dimensioned so as to each be capable of receiving therewithin a shear member 16. The function of the shear members 16 is both that of a force resisting member and that of a spacer. Namely each shear member 16 functions as a torque and shear force resisting member to resist the forces imparted to the compression plate 14 as a consequence of the action of the superconducting magnets cooperatively associated therewith. With regard to the spacer function, each shear member 16 operates to effect a spacing between adjoining, superimposed compression plates 14. The shear members 16 are maintained in the aforementioned recesses (not shown) by virtue of the fact that adjoining, superimposed compression plates 14 are interconnected along their perimetric surfaces such as by means of welding. The inherent strength of the individual compression plates 14 as well as the manner of effecting the interconnection therebetween is operative to provide a prior art form of compression hub that embodies the requisite degree of strength so as to be usable in Tokamak-type fusion reactor system. In conclusion, provision is also made for coolant flow between adjoining, superimposed compression plates 14 by providing each of the latter with a suitable number of openings. More specifically, as shown in FIG. 3 the compression plate 14 is provided with an opening 18 formed therein so as to be located in proximity to one of the hexagonal corners thereof. Moreover, the compression plate 14 has a larger opening 20 formed at the center thereof so as to extend completely therethrough the same as the previously described opening 18. For purposes of clarity of description, another small opening, identified by reference numeral 22, is depicted in FIG. 3 by means of phantom lines. The latter is shown located adjacent one of the other hexagonal corners of the compression plate 14. The opening 22 is intended to depict an opening similar to the opening 18, but one which is suitably provided in the compression plate (not shown) that is located below the compression plate 14 illustrated in FIG. 3. To summarize, the openings 18, 20 and 22 function to establish, along with similar openings provided in others of the multiplicity of compression plates 14, a fluid flow passage for coolant through the compression plates 14 in a manner which can be found more fully described in U.S. Pat. No. 4,174,254. In accord therewith, a prior art form of compression hub is provided that is capable of being cooled to the desired cryogenic temperature.

The compression hubs embodying prior art forms of construction that have been known heretofore are disadvantageously characterized in the fact that the constructions which they embody permit eddy currents, which may be induced therein as a consequence of the occurrence of changes in magnetic field flux, to circulate therethrough. The existence in such compression hubs of freely circulating eddy currents in turn provide various losses in the form, for example, of the creation of heat losses, that can have an adverse effect on the performance characteristics of the compression hub. Thus, a need has been evidenced for a new and improved form of compression hub, which is advantageously characterized in the fact that eddy currents, which may be induced in the compression hub from changes in magnetic field flux, are prevented from circulating therethrough. Namely, a need has been evidenced for a compression hub with eddy current prevent means. Moreover, the compression hub 10 shown in FIG. 1 and which is now to be described hereinafter comprises such a compression hub with eddy current prevent means.

As best understood with reference to FIGS. 4 and 2 of the drawing, the compression hub 10 embodies, yet to be described, eddy current prevent means, the latter being operative to impede the circulation through the compression hub 10 of eddy currents that may be induced therein due to changes in magnetic field flux. In accord with the preferred form of the invention, the aforesaid eddy current prevent means comprises means with which each of the compression plates that collectively comprise the compression hub 10 is provided. More specifically, the compression hub 10, as best understood with reference to FIG. 2, consists of a multiplicity of compression plates 24 that are superimposed one upon the other so as to form a layered assembly thereof. Each of the compression plates 24 embodies a polygonal shape, i.e., that of a hexagon. However, some other form of a multi-sided figure could be utilized without departing from the essence of the invention. Moreover, each of the plates 24 is formed from a suitable material that is capable of providing the strength characteristics desired at cryogenic temperatures. Preferably, the compression plates 24 are suitably interconnected along their perimeters as a result of being welded one to another. As will be described more fully hereinafter, the compression plates 24 are each provided with suitable flow passages whereby coolant can be made to flow through the compression hub 10. To this end, the compression hub 10 is provided with suitable inlet means and outlet means whereby coolant can be fed to the compression hub 10 and after the passage therethrough can be removed therefrom. Inasmuch as such inlet means and outlet means are of conventional construction which is well-known to those skilled in the art, it is not deemed necessary to further describe them herein. In accord with the illustration of the compression hub 10 in the drawing of the instant application, the aforementioned outlet means has been depicted in FIG. 2 wherein it is identified by the reference numeral 26, whereas a showing of the aforementioned inlet means is omitted from the drawing.

Figure 5:
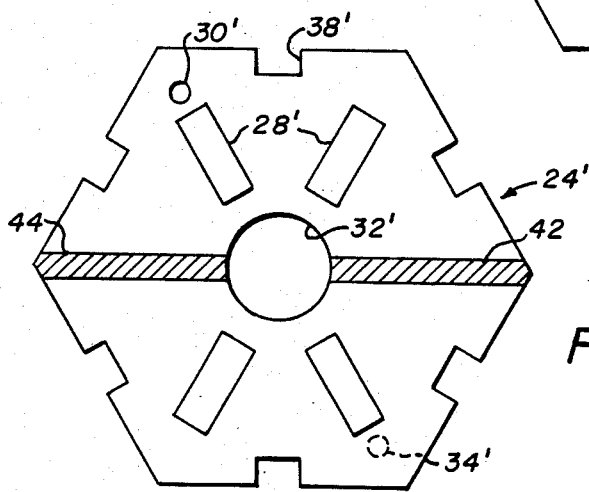
FIG. 5 is a plan view of another embodiment of a compression plate employable in a compression hub with eddy current prevent means constructed in accordance with the present invention.

Proceeding now with a more detailed description of the nature of the construction of the compression plates 24, reference will be had for this purpose to FIGS. 4 and 5 of the drawing. In accord with the present invention, alternative forms of construction for the compression plates 24 are disclosed. More specifically, alternative constructional forms for the eddy current prevent means with which the compression plates 24 are provided are disclosed. Thus, referring first to FIG. 4 of the drawing, there is illustrated therein a compression plate 24 which in structure bears a resemblance to the prior art form of compression plate 14 described previously above, and illustrated in FIG. 3. That is, the compression plate 24 as noted above embodies a hexagonal configuration and is made of a material that possesses the strength desired at cryogenic temperatures. In addition, the compression plate 24 shown in FIG. 4 is provided with a plurality of suitable recesses (not shown) in each of which a shear member 28 is designed to be suitably received such that the latter is captured therein when another compression plate 24 is superimposed thereover. Like the shear member 16 with which the prior art compression plate 14 is provided, the shear member 28 is intended to not only offer resistance to the torque and shear forces which are imparted to the compression hub 10 from the superconducting magnets 12, but also to establish the desired spacing between adjacent compression plates 24.

Continuing with the description of the compression plate 24 of FIG. 4, the latter further includes a plurality of openings, i.e., the small opening 30 provided therein adjacent one of the hexagonal corners of the plate 24 and the larger opening 32 formed substantially at the center thereof. The openings 30 and 32 are operative in the manner of the openings 18 and 20 of the compression plate 14 to establish a flow passage through the compression plate 24 as well as between adjacent compression plates 24. To this end, there is depicted in phantom lines in FIG. 4 another small opening, identified therein by the numeral 34, which is intended to denote the small opening similar to the opening 30, which is formed in the plate 24 that is located directly below the plate 24 that is shown in FIG. 4. Note is taken here of the fact that preferably the compression plates 24 are suitably positioned relative to each other so as to form a layered assembly wherein the openings 30 are offset as between adjacent plates 24. This is best understood with reference to FIG. 2 of the drawing.

The compression plate 24, unlike the prior art compression plate 14, embodies an eddy current prevent means that is operative to impede the circulation of induced eddy currents therethrough. In this end, the compression plate has a radial cut provided therein. The latter radial cut extends from the outer perimeter of the plate 24 to the inner perimeter thereof, i.e., the surface that defines the circumference of the large opening 32. Furthermore, the radial cut extends completely through the plate 24, i.e., through the entire thickness of the latter. Finally, in accord with the best mode embodiment of the invention, the afore-described radial cut which effectively forms an interruption in the circumference of the plate 24 has inserted therein a suitably dimensioned and configured piece 36 of insulative material. Any suitable known type of material possessing the desired insulative characteristics and capable of being employed at the cryogenic temperatures to which the compression plates 24 are designed to be cooled may be employed. Moreover, any conventional form of securing means may be employed for purposes of retaining the piece 36 of insulative material in place within the afore-described radial cut. It is to be understood that in accord with the best mode embodiment of the invention each of the compression plates 24 which the compression hub 10 embodies would be provided with such a radial cut in which a piece 36 of insulative material is emplaced. Moreover, as best understood with reference to FIG. 2 of the drawing, the compression plates 24 are preferably suitably arranged when in the assembled condition such that the insulative pieces 36 are offset relative to each other at least as between adjacent plates 24.

For purposes of completing the description of the compression plates 24 of FIG. 4, note is taken of the slots 38 that are provided in the outer surfaces of each of the six sides thereof. The slots 38 extend the full thickness of the plate 24, and are intended to be operative for purposes of effecting the interconnection of the superconducting magnets 12 to the compression hub 10. To this end, each of the superconducting magnets 12 embodies a protrusion 40, as shown in FIG. 1, which is designed to be received within a corresponding one of the slots 38. Inasmuch as the function of the slots 38 and protrusions 40 is not related directly to the subject matter of the present invention, any further discussion of the nature of the construction and/or mode of operation thereof has been omitted from herein. Should a further description thereof be desired, reference may be had for this purpose to the teachings thereof that are to be found contained in the prior art.

Turning next to a consideration of the structure that is to be found illustrated in FIG. 5 of the drawing, the latter Figure depicts a compression plate constructed in accord with the teachings of the present invention that embodies an alternative form of eddy current prevent means. More specifically, there is shown in FIG. 5, a compression plate, generally designated by the reference numeral 24', which is basically similar in construction and mode of operation to the compression plate 24 illustrated in FIG. 4 that has been described hereinabove. In view of the similarity therebetween, any elements of the compression plate 24' of FIG. 5 that find correspondence with an element of the compression plate 24 of FIG. 4 is identified in FIG. 5 through the use of the same reference numeral that has been employed in FIG. 4 for designating the similar element therein, but with the addition in FIG. 5 of a prime to the numeral.

Thus, by way of a brief description of the nature of the construction of the compression plate 24', the latter embodies the shape of a hexagon, and is formed from a suitable material possessing adequate strength at cryogenic temperatures. A plurality of shear members 28' are received in recesses (not shown) provided for this purpose in both the upper and lower planar surfaces of the plate 24'. Openings 30' and 32' of differing dimensions are suitably formed in the plate 24' so as to be operative as flow passages for coolant. There is also shown in phantom lines in FIG. 5 an opening 34' that is formed in the plate 24' which lies immediately below the plate 24' that appears in FIG. 5. Slots 38' are provided in the outer surface of each of the six sides of the plates 24', and are designed to cooperatively receive therewithin the protrusions 40 with which the superconducting magnets 12 are provided.

As stated above, the compression plate 24' of FIG. 5 differs structurally from the compression plate 24 of FIG. 4 insofar as concerns the eddy current prevent means which the former embodies. By way of reiteration, in both cases, the function of the eddy current prevent means is to impede the circulation of induced eddy currents through the compression plate, be it the plate 24 of FIG. 4 or the plate 24' of FIG. 5. To this end, both the plate 24 and the plate 24' are provided with at least one interruption that is formed in the circumference thereof. In the case of the plate 24 of FIG. 4, as has been described above, the interruption takes the form of a radial cut that is suitably located therein, and which is designed to receive therewithin a piece 36 of insulative material. However, in the case of the plate 24' of FIG. 5, the latter in essence embodies two interruptions that are suitably located therein so as to be aligned along a common axis. More specifically, the aforesaid two interruptions are preferably created by making the plate 24' in two segments that are designed to mate with each other such that a space exists therebetween, i.e., so that the aforedescribed two interruptions exist therebetween. Moreover, each of the two interruptions is designed to extend from the outer surface of the plate 24' to the inner surface thereof, i.e., the inner surface thereof that defines the circumference of the opening 32'. Thus, in essence, the aforesaid two interruptions coact to provide the plate 24' with a through cut that extends across the entire width and thickness of the plate 24'. Finally, in accord with the teachings of the present invention, a piece of insulative material, 42 and 44, respectively, is inserted in each of the two interruptions that exist by virtue of forming the plate 24' as two mating segments. Briefly then, the two pieces 42 and 44 function in a manner similar to the piece 36 with which the plate 24 is provided. In conclusion, it is to be understood that the plates 24' could be substituted for the plate 24 to form the compression hub that is illustrated in FIGS. 2 and 1 of the drawing.

Thus, in accordance with the present invention, there has been provided a novel and improved compression hub that is designed to be cooperatively associated with a plurality of superconducting magnets in a Tokamak-type fusion reactor system. Moreover, the subject compression hub of the present invention embodies a sufficient structural strength as to be capable of resisting the intense forces produced by the superconducting magnets that tend to draw the latter together towards a common point whereat the compression hub is located. In addition, in accord with the present invention, the compression hub embodies a construction that permits the latter to be cooled to a temperature that is commensurate with the operating temperature of the superconducting magnets, while yet enabling the compression hub to retain the structural strength required thereof. Further, the compression hub of the present invention embodies means operative to impede the circulation of eddy currents therethrough, while yet possessing the strength and cooling characteristics desired of a compression hub. Additionally, in accordance with the present invention, a compression hub is provided embodying such eddy current prevent means wherein the latter consists of an interruption provided in the surface of the elements that collectively comprise the compression hub. Also, the compression hub of the present invention embodies eddy current prevent means wherein the interruption provided in the surface of the elements takes the form of a radial cut in which an insulative material is inserted. Finally, in accord with the present invention, a compression hub is provided wherein the interruption provided in the surface of the elements is effected by fabricating the elements from multiple segments that in the assembled state are separated one from another by means of insulative material.

While only one embodiment of my invention has been shown, it will be appreciated that modifications thereof, some of which have been alluded to hereinabove may readily be made thereto by those skilled in the art without departing from the essence of the invention. I, therefore, intend by the appended claims to cover the modifications alluded to herein as well as all other modifications which fall within the true spirit and scope of my invention.

I claim:

1. A compression hub for a fusion reactor system for purposes of providing resistance to the forces tending to draw the magnets in the fusion reactor system together toward a common point comprising a multiplicity of compression plates arranged in a layered assembly and interconnected so as to form a unitary structure, each of said compression plates being of a polygonal shape and having a first opening formed at the center thereof, each of said compression plates further having a second opening operative as a flow passage for coolant formed therein adjacent one of the corners defined by the polygonal shape of each of said compression plates, a first set and a second set of shear members associated with each of said compression plates, said first set of shear members including a first shear member supported on one side of said first opening of each of said compression plates and a second shear member supported on another side of said first opening of each of said compression plates, said second set of shear members including a third shear member supported on one side of said first opening of each of said compression plates and a fourth shear member supported on another side of said first opening of each of said compression plates, each of said compression plates having an interruption formed therein extending from said first opening formed therein to the circumference of said compression plate, said interruption having a piece of insulation positioned therein and dimensioned so as to completely fill said interruption, said insulation filled interruption of each of said compression plates being operative to impede the circulation through each of said compression plates as well as through the entire compression hub of eddy currents induced therein, said multiplicity of compression plates when arranged in a layered assembly being positioned relative to each other such that said first set of shear members of each of said compression plates lie in a first common plane that passes through said first opening of each of said compression plates and extends the length of the compression hub, said second set of shear members of each of said compression plates lie in a second common plane that extends the length of the compression hub and intersects said first common plane at the center of said first opening formed in each of said compression plates, said second opening of each adjacent pair of said multiplicity of compression plates lie in a third common plane that intersects both said first common plane and said second common plane at the center of said first opening formed in said adjacent pair of compression plates, said interruption formed in each of said compression plates defines a fourth common plane that extends the length of the compression hub and intersects said first common plane, said second common plane and said third common plane at the center of said first opening formed in each of said compression plates.

2. A compression hub as set forth in claim 1 wherein said interruption formed in each of said compression plates consists of a radial cut made in each of said compression plates.

3. A compression hub as set forth in claim 1 wherein each of said compression plates is formed of mating segments, and said interruption comprises the space existing between ends of the mating segments when the mating segments are in the mated state.

* * * * *